C. W. BASS.
VEHICLE BRAKE.
APPLICATION FILED JAN. 21, 1914.
1,101,236.
Patented June 23, 1914.
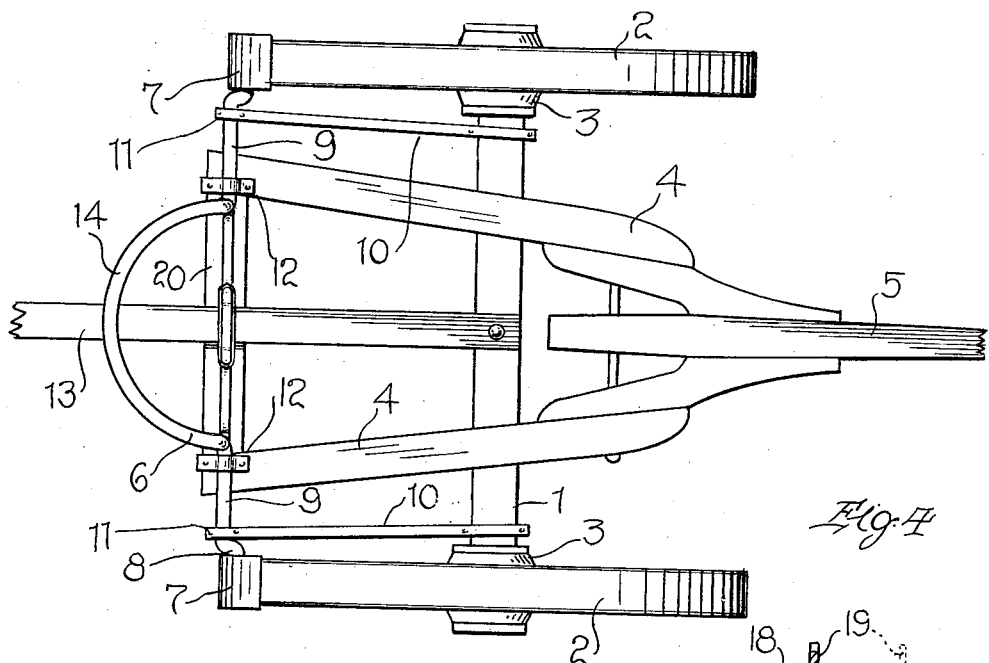
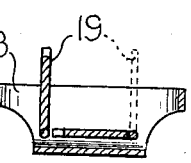
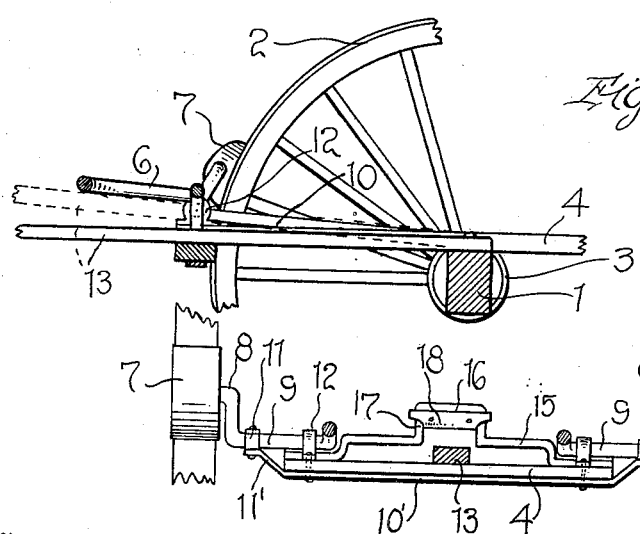
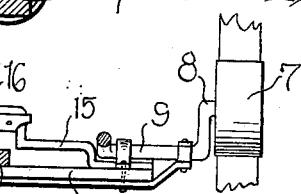
Witnesses
Robert M. Sutphen
A. I. Hind.
Inventor
C. W. Bass
By Watson E. Coleman
Attorney

UNITED STATES PATENT OFFICE.

CHARLIE W. BASS, OF HEADLAND, ALABAMA.

VEHICLE-BRAKE.

1,101,236.  Specification of Letters Patent.  Patented June 23, 1914.

Application filed January 21, 1914. Serial No. 813,569.

*To all whom it may concern:*

Be it known that I, CHARLIE W. BASS, a citizen of the United States, residing at Headland, in the county of Henry and State of Alabama, have invented certain new and useful Improvements in Vehicle-Brakes, of which the following is a specification, reference being had to the accompanying drawings.

This invention relates to new and useful improvements in vehicle brakes and the main object of the present invention resides in the provision of a vehicle brake which is adapted to be operated by the movement of the reach pole of the vehicle so that the same will be automatically set when going down grade and released on reaching a level or comparatively up grade.

Another object of the invention is the provision of a vehicle brake of the above character which will possess advantages in points of efficiency and durability, is inexpensive to manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1 is a top plan view illustrating the application of my invention. Fig. 2 is a transverse sectional view. Fig. 3 is a rear elevation of the brake supporting member. Fig. 4 is a longitudinal sectional view of the brake locking member.

Referring more particularly to the drawings, 1 indicates the forward axle of a wagon having mounted upon each end thereof the wheels 2, provided with suitable hubs 3. Mounted upon the axle 1 is a hound 4, to the forward end of which is connected the tongue 5.

My improved wagon brake includes a heavily formed rod, generally indicated by the numeral 6, the ends of which are arranged upon each side of the inner end of the hound 4, said ends being offset and pivotally mounted upon the same are the brake shoes 7 which are adapted to be normally disposed in a position directly adjacent the periphery of the wheels 2 at the rear thereof so that the same may be readily applied to the wheels when necessary. From the accompanying drawings it will be readily noted that the ends 8 of the rod 6 are disposed upon an incline with respect to the body of the rod, as clearly illustrated in Fig. 2, so that upon the downward movement of the ends, the brake shoes 7 will be quickly and readily applied to the periphery of the wheels 2. The rod 6 is bent inwardly at right angles to the ends 8 to form horizontally disposed portions 9 which are supported at their outer ends by means of the brackets 10, the forward ends of which are secured to the axle 1 adjacent the hubs 3, while the rear ends thereof are provided with suitable boxings 11 in which the horizontal portions are rotatably mounted. The inner ends of the horizontal portions 9 are rotatably mounted within suitable boxings 12 which are carried by the inner ends of the hound member 4, so that upon the actuation of the central portion of the rod, the ends 8 thereof will be forced downwardly and engage the brake shoes 7 with the periphery of the wheels.

A suitable bracing bar 10' is provided, the intermediate portion of which is disposed directly beneath the inner end of the hound and the ends thereof are up-turned, as shown at 11' and secured to the underside of the boxings 11. From this it will be seen that the ends of the brace member 10' will materially assist in supporting the inner ends of the brackets 10. The intermediate portion of the rod 6 is formed substantially semi-circular in shape and bears against the upper face of the reach pole 13 and it will be understood that upon the forward movement of the reach pole which is generally provided with a certain amount of lost motion, the upward movement of the reach pole will bear upon the circular portion 14 of the rod, thus rotating the substantially horizontal portions 9 and pressing downwardly upon the ends 8, forcing the brake shoes 7 against the periphery of the wheels 2.

From the above description taken in connection with the accompanying drawings, it will be readily apparent that I have provided a simple and durable brake which can be quickly and readily applied to the wagon, and which will be operated by the movement of the reach pole of the vehicle so that the same will be automatically set on going down grade and will be released when going up grade or traveling on the level.

In order to prevent the brake shoes from setting when it is desired to back the wagon, I provide a suitable lock which includes a transverse rod 15, the ends of which are secured to the hound adjacent the bearings 12 and the intermediate portions thereof provided with substantially rectangular offsets 16, forming two parallel upright members 17 upon which is slidably mounted the ends of a U-shaped casing 18. Pivotally mounted within the casing 18 are the key members 19 which, when not in use, are quickly disposed in a horizontal position within the casing and when it is desired to lock the brake shoes against setting, the keys 19 are disposed in a vertical position and adapted to engage the transverse portion of the offset 16 and force the casing downwardly into engagement with the reach pole, so as to prevent the same from moving upwardly and at the same time forcing upwardly upon the semi-circular portion 14 and setting the brakes. From this, it will be seen that when it is desired to back the wagon, the brake shoes are retained against locking movement by means of the keys 19 which force the casing 18 downwardly into engagement with the reach pole and retain the semi-circular portion 14 of the rod 6 against upward movement.

From the foregoing, it will be apparent that in traveling down hill, the draft animals will necessarily hold back upon the tongue which will raise the tongue and force the hounds downwardly, engaging the semi-circular portion 14 with the reach pole and forcing the brake shoes 7 into engagement with the periphery of the wheels 2. Thus, as the reach pole 13 is forced upwardly by the holding back of the draft animals, the medial portion of the semi-circle 14 will be forced upwardly, rotating the horizontal portions 9 and bringing the brake shoes into engagement with the wheels 2, so as to apply the brakes thereto and slacken the speed of the vehicle. It will also be apparent that I have provided a simple and durable device which can be manufactured and placed upon the market at a comparatively small cost.

While I have shown and described the preferred form of my invention, it will be obvious that various changes in the details of construction and in the proportions may be resorted to for successfully carrying my invention into practice without sacrificing any of the novel features or departing from the scope of the appended claims.

What I claim, is:

1. The combination with a wagon including an axle having a wheel mounted upon each end, a hound supported by the axle, a reach pole having its inner end supported by the hound, of a brake rod having its medial portion semi-circular in form, the ends thereof being disposed in a horizontal position and then bent at right angles to form inclined end portions, a brake shoe mounted upon said end portions adapted to engage the periphery of the wheel, boxings carried by the wagon and in which the horizontal portions are rotatably mounted, so that upon the upward movement of the reach pole, the circular portion of the rod will be actuated to rotate the horizontal portions and force the ends of the rods downwardly, as and for the purpose set forth.

2. A device of the class described including brake actuating mechanism, a transverse rod having a substantially rectangular offset portion providing spaced parallel arms, a casing member having its ends slidably mounted upon said arms, and pivoted key members arranged within said casing and adapted for engagement with the intermediate portion of the offset, as and for the purpose set forth.

In testimony whereof I hereunto affix my signature in the presence of two witnesses.

CHARLIE W. BASS.

Witnesses:
L. T. SOLOMON,
W. P. HARDWICK.